United States Patent [19]
Rhees et al.

[11] Patent Number: 5,616,234
[45] Date of Patent: Apr. 1, 1997

[54] METHOD FOR PRODUCING CHLORINE OR HYPOCHLORITE PRODUCT

[75] Inventors: Raymond C. Rhees, Boulder City, Nev.; Ralph E. Behrens; Kathy J. Reid, both of Cedar City, Utah; Lowell B. Morgan, Las Vegas, Nev.

[73] Assignee: Pepcon Systems, Inc., Las Vegas, Nev.

[21] Appl. No.: 551,290

[22] Filed: Oct. 31, 1995

[51] Int. Cl.$^6$ ............................... C25B 1/26; C25B 15/08
[52] U.S. Cl. ........................ 205/500; 205/620; 205/687
[58] Field of Search ........................... 205/620, 500, 205/687

[56] References Cited

U.S. PATENT DOCUMENTS

| | | | |
|---|---|---|---|
| 2,468,766 | 5/1949 | Low | 204/128 |
| 2,719,822 | 10/1955 | Kassel | 204/128 |
| 3,129,152 | 4/1964 | Teske et al. | 205/618 |
| 3,434,948 | 3/1969 | Hooker et al. | 205/620 |
| 3,634,216 | 1/1972 | Gibson et al. | 204/83 |
| 3,920,529 | 11/1975 | Sprague | 205/618 |
| 4,038,170 | 7/1977 | Rhees et al. | 204/290 |
| 4,089,771 | 5/1978 | Westerlund | 204/284 |
| 4,171,256 | 10/1979 | Themy | 204/239 |
| 4,238,302 | 12/1980 | Lohrberg | 205/500 X |
| 4,251,335 | 2/1981 | Bergner et al. | 205/531 X |
| 4,279,712 | 7/1981 | Satoh et al. | 204/128 |
| 4,308,123 | 12/1981 | Lynn | 204/266 |
| 4,334,968 | 6/1982 | Sweeney | 204/96 |
| 4,496,452 | 1/1985 | Bianchi | 204/266 |
| 4,555,323 | 11/1985 | Collier | 204/258 |
| 4,613,415 | 9/1986 | Wreath et al. | 204/98 |
| 4,693,806 | 9/1987 | Tucker | 204/252 |
| 4,781,810 | 11/1988 | Tucker | 204/228 |
| 4,795,535 | 1/1989 | Bolduc et al. | 205/620 X |
| 5,354,435 | 10/1994 | Kaczur et al. | 204/95 |
| 5,362,368 | 11/1994 | Lynn | 204/98 |
| 5,385,650 | 1/1995 | Howarth et al. | 204/103 |

*Primary Examiner*—Donald R. Valentine
*Attorney, Agent, or Firm*—Beveridge, DeGrandi, Weilacher & Young, L.L.P.

[57] ABSTRACT

A process is described for the production of chlorine directly at the site where it is intended to be used and at the required rate. Hazards associated with the transport and storage of large quantities of liquefied chlorine under pressure are thus eliminated. The chlorine is produced electrochemically from a chloride containing electrolyte which is maintained at a pH no higher than 6, where the chlorine compounds are present as chlorine and hypochlorous acid.

22 Claims, 5 Drawing Sheets

METHOD FOR PRODUCING CHLORINE OR HYPOCHLORITE PRODUCT

INTRODUCTION AND BACKGROUND

The present invention relates to a method of producing chlorine on site. More particularly, the present invention relates to a method for continuously producing chlorine. In a further aspect, the present invention relates to an apparatus for producing chlorine. In addition, the present invention relates to a process for the treatment by chlorine of a substance.

Chlorine is a useful and frequently essential treatment chemical. It can be used in the following applications: Disinfection of both potable water and wastewater from sewage treatment plants to prevent the spread of disease (see Kirk-Othmer's *Encyclopedia of Chemical Technology*, Third Edition, volume 24, pages 327–441, which is incorporated by reference); control of marine growth in cooling water for power plants to keep the lines in power plants free from marine growth and encrustations; as an oxidant for odor control where the odorous compound can be destroyed by oxidation; as bleaching agent both industrially and in household bleach; as a sanitation agent, including food processing applications; and it is a major intermediate chemical used for the production of other chemicals.

The production of chlorine electrochemically in large chlorine/caustic plants using complex cells which keep the products from the anode separate from the products of the cathode is a well known art (see Kirk-Othmer's *Encyclopedia of Chemical Technology*, Third Edition, volume 1, pages 799–865 and volume 8, pages 662–695, which are incorporated by reference). Chlorine is produced in large facilities located near an economical source of power with NaCl as principle source of chlorine. The electrochemical cells used for the production of chlorine are complex, containing at least two compartments—an anolyte compartment in which chlorine is produced and a catholyte compartment in which sodium hydroxide is produced. These compartments are separated by a porous membrane or a separator. Chlorine gas produced at the anode is collected, cooled and compressed to a liquid and placed in heavy steel cylinders for transport to the point of use.

At the point of use the chlorine is permitted to volatilize to a gas, is absorbed in water and the water solution used for disinfection, bleaching, etc. The empty cylinders are returned for reuse. It was considered unlikely that novel methods of production can be found to produce chlorine at the point of use as inexpensively as bulk chlorine/caustic facilities.

Hydrochloric acid has been used as a feed material to electrolytic cells in the electrolyzers to produce chlorine gas. This has been done to recycle by-product hydrogen chloride from systems using chlorine in the preparation of other chemicals or intermediate process chemicals. Such processes (as described, for example, in U.S. Pat. 2,468,766; 3,129,152; and 2,719,822) use complex diaphragm electrolyzers and are tailored to the recycle system and the economics of the specific plant.

At ambient temperature and pressure chlorine is a hazardous, toxic, heavy gas which does not disperse readily if released accidentally to the atmosphere from its pressurized heavy cylinders. These hazardous properties require imposition of rigid regulations for the packaging, handling and transport of chlorine. In extreme situations the concern over the possible accidental release of chlorine has resulted in the prohibition of the transport of chlorine through the streets of some communities, thus preventing the use of chlorine for some of its essential uses.

This problem has been minimized in some cases by venting the chlorine from the chlorine/caustic plant with the co-produced sodium hydroxide to make sodium hypochlorite which can then be transported to the site of use. The concentration of sodium hypochlorite generally is in the range of about 15% by weight contained chlorine. While sodium hypochlorite (NaOCl) retains several of the useful properties of chlorine (e.g., disinfection, sanitation, odor control), it also increases the cost of transport since it contains almost 85% water, is unstable, and decays with time. Salt and excess caustic from the preparation of sodium hypochlorite are contaminating by-products transferred to the system being treated.

With the availability of seawater at some use sites, hypochlorite generating systems have been developed for the production of sodium hypochlorite on-site. This is done by the electrolytic conversion of a portion of the sodium chloride in the seawater to sodium hypochlorite. The weak sodium hypochlorite solution is then used for control of marine organisms in condenser cooling water at power plants, sanitation purposes and other uses. The presence of other impurities in the seawater (i.e., calcium, magnesium, bicarbonate and sulfate ions) results in formation of solids in the electrolyzer and associated piping. These scaling problems complicate the operations of such systems.

There are many situations and/or locations throughout the world where the cost of chlorine at the point of application is many times greater than the cost of chlorine at the bulk chlorine/caustic plant. It is desirable to produce chlorine at the point of application and thus avoid compression of the chlorine gas to a pressurized liquid and transporting the pressurized chlorine gas or the sodium hypochlorite produced from it to the site of application. The need then is for a process using industrially available materials to efficiently produce chlorine at the site of use in non-hazardous conditions, without undesirable by-products, at the rate required for the applications, and by a system that will require little operational expertise or supervision. Still needed is an uncomplicated system for producing chlorine: on site, as required, free from impurities and by-products, from commercially available raw materials, with environmental advantages, and being cost competitive on a site selective basis.

Much of the prior art related to production of chlorine and/or chlorine dioxide use a multi-compartment electrolyzer which separates the anolyte from the catholyte to prevent the reduction of the chlorine at the cathode, such reduction at the cathode results in low current efficiency:

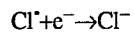

Water and cations ($H^+$, $H_3O^+$, $Na^+$) on passing through the membrane pass from a low pH region (the anolyte) to a high pH region (the catholyte). The hardness cations also pass or attempt to pass through the membrane, but tend to form solids ($Ca^{++}$ and $Mg^{++}$ hydroxides and carbonates) which decrease the porosity and performance of the membranes. Various ways of overcoming or minimizing this problem have been suggested, such as purification of the NaCl and/or the water or adding complexing agents for the scale forming substances in the electrolyte and air. This scaling problem complicates the process, decreases efficiencies, and increases maintenance of the system or decreases the life of the system.

U.S. Pat. No. 5,039,383 discloses a process for the generation of halogen (e.g., chlorine) in an electrolytic cell by the electrolysis of a hydrohalic acid contained in an aqueous hydrohalic acid solution as the cell electrolyte while maintaining the solution at an elevated temperature (at least about or above 40° C.). The cell is provided with a means to continuously remove molecular hydrogen and halogen and electrolyte water from the cell by sparging the electrolyte with an inert gas (e.g., air). The process employs volume control instead of pH control. However, this process has several disadvantages not present in the present invention: The electrolyte is continuously exposed to reducing conditions which results in lower efficiencies. The purge of electrolyte in the cell is not very efficient. Elevated temperature increases the corrosion potential throughout the system and the heat load on the treated system (e.g., cooling tower), HCl carry-over is also increased. Multiple openings and an open space for gas collection are required which could result in a possible explosion hazard. High cell voltage, with resulting increased cost, is required. Electrical conductivity is dependent on HCl concentration.

SUMMARY OF THE INVENTION

One object of the present invention is to provide a process for the continuous production of chlorine. The process involves:

introducing an electrolyte into an electrolyzer, the electrolyzer having at least one anode and at least one cathode in contact with the electrolyte, providing an electric current across the electrolyzer to cause formation of $H_2$ and $Cl_2$ in the electrolyte, continuously removing the electrolyte from the electrolyzer to an air stream in a gas stripping column removing the $H_2$ and $Cl_2$ from the electrolyte in the gas stripping column, and recycling the electrolyte from which $H_2$ and $Cl_2$ has been removed into the electrolyzer;

the electrolyte being maintained at a pH of 1 to 6, the electrolyte comprising (a) water, (b) HCl or $H_3OCl$, and (c) a salt selected from a chloride of an alkali metal, a chloride of an alkaline earth metal, and mixtures thereof.

The invention as herein described surprisingly eliminates scaling problems by never allowing the electrolyte to become basic.

Another object of the present invention is to provide a process for the treatment by chlorine of a substance. The process involves the above steps and contacting the $Cl_2$ removed from the electrolyte in the gas stripping column with a substance to be treated.

Yet another object of the present invention is to provide an apparatus for producing chlorine. The apparatus includes:

an electrolyzer having one or more electrolytic cells each containing at least one cathode and at least one anode, a gas stripping column, wherein the electrolyzer is in fluid communication with the gas stripping column, means for removing $Cl_2$ and $H_2$ from the gas stripping column, means for recycling an electrolyte from the gas stripping column to the electrolyzer, and a rectifier for providing DC current to the electrolyzer.

BRIEF DESCRIPTION OF THE DRAWINGS

The present invention will be further understood with reference to the drawings, wherein.

DETAILED DESCRIPTION OF THE INVENTION

Figure 1:
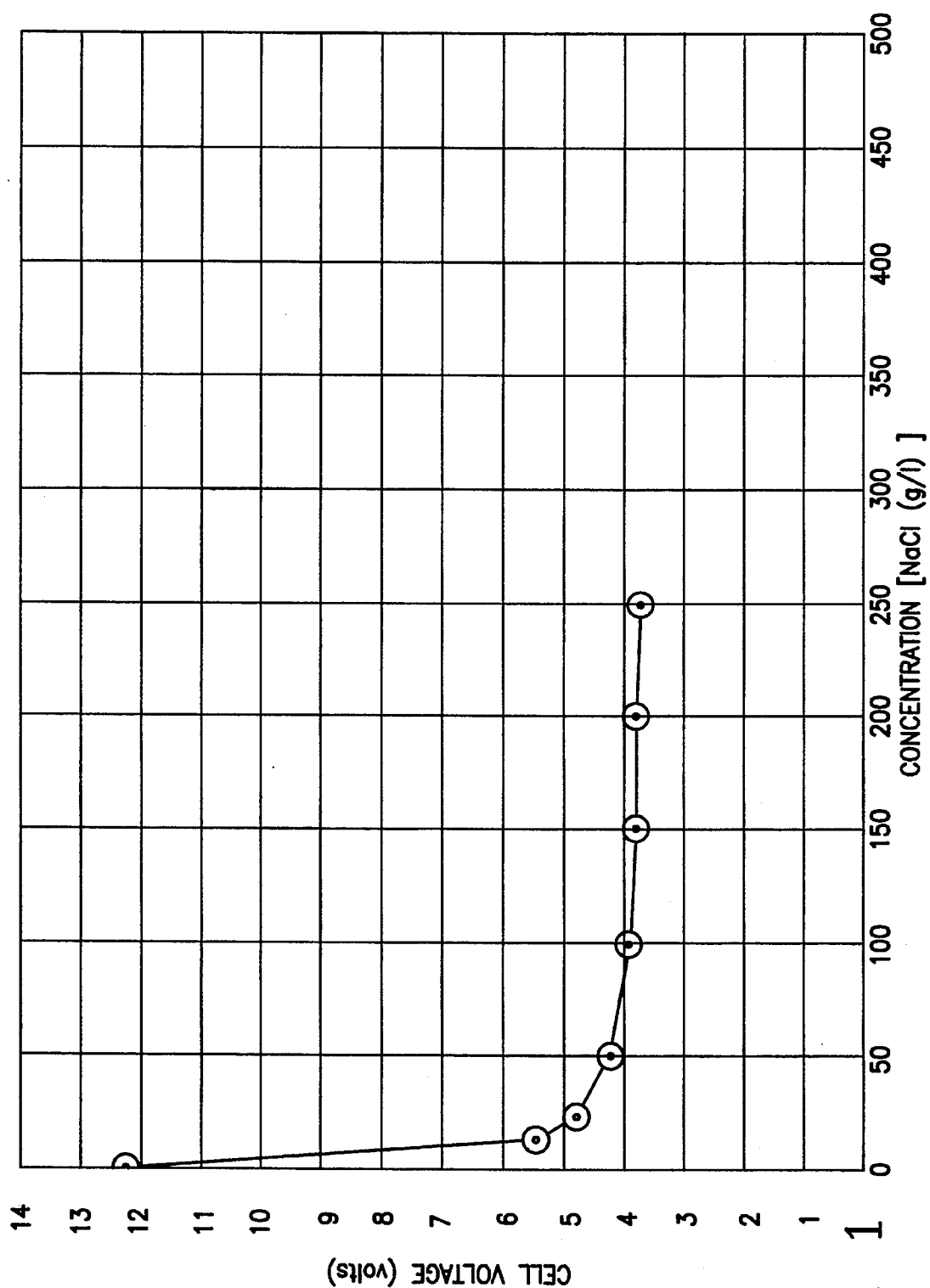
FIG. 1 is a graph of the relationship between voltage and salt concentration.

In the present invention the chlorine produced at the anode of the electrolytic cell is transferred from the electrolyte to the air of a gas stripping column as fast as it is produced, thus preventing the back reaction $Cl^·+e^-\rightarrow Cl^-$ from occurring. This permits achieving the high current efficiencies demonstrated by the present invention.

The present invention provides a system which produces chlorine electrochemically from hydrochloric acid, salts such as sodium chloride, water, air and electricity; separates the volatile chlorine to an air stream; transfers the air and chlorine gas to the point of use under reduced pressure; mixes the air and chlorine with the substance to be treated at the rate required; and does this under hazard-free conditions.

The present invention avoids the hazards associated with the transporting and handling of pressurized chlorine cylinders and avoids the equipment necessary for the injection of the chlorine into the water or caustic for which it is to be used. Described herein is a system which is capable of producing quantities of gaseous chlorine at the rate it will be used. This will eliminate the hazards associated with the handling of pressurized chlorine cylinders. The present invention makes it possible to make-and-use chlorine in the amount needed anywhere in the world where water, salt (e.g., NaCl), air, hydrochloric acid (HCl) and electricity are available.

In carrying out the invention, it is preferable that three major components are utilized:
1. An electrolyzer (electrolysis cell) to produce the chlorine.
2. A gas stripping column to separate the chlorine from the aqueous electrolyte.
3. A vacuum pump (eductor)/treatment tank combination to contact the solution to be treated with the air-chlorine mixture from the stripping column.

Essential Auxiliary Equipment Required Include a. A rectifier to provide DC electrical current to the electrolyzer.
b. A recirculation pump to circulate the electrolyte from the base of the gas stripping column (stripper tower) through the electrolyzer into the appropriate location near the top of the gas stripping column.
c. A pump to circulate the solution to be treated through the eductor where it is contacted by the air-chlorine mixture.

Additional sensors, meters and fail-safe devices may added as required.

The equipment listed above and herein are well known in the art. A more detailed explanation of the equipment is found in the discussion of FIGS. 2 and 3 below.

The substances required for the generation and transport of chlorine are the following:
(1) Water,
(2) Air,
(3) Salt-NaCl or alkali metal (Li, Na, K, Rb, Cs, Fr) or alkaline earth metal (Ca, Sr, Ba, Ra, Mg) chlorides, and
(4) Hydrochloric acid (or $H_3OCl$).

In addition, electricity is required.

It was discovered that the simplicity of the process could be achieved by causing system components and/or substances to perform multiple functions.

In the process of the invention, water provides the liquid solvent or carrier for the electroactive chlorine containing chemicals (e.g., HCl, NaCl) and the products of the electrochemical reaction ($Cl_2$, $H_2$). Water acts as a pumpable fluid for circulating the electrolyte from the collection basin at the base of the stripping column through the electrolyzer and to the gas separation zone of the stripping column, and it further acts as a reactant in the electrolytic process.

Air acts as the stripping medium to remove the chlorine and hydrogen and any other volatile substances from the electrolyte, transferring them from the electrolyte solution to the air. More particularly, air dilutes the volatile hazardous cell gases that are created (e.g., $H_2$, $Cl_2$, $O_2$) and so brings their concentration to levels below explosive limits. Air also acts as a carrier for chlorine from the stripping tower to the point of use. The air intimately mixes the chlorine with the water being treated as the air and the water being treated pass through the eductor (see FIGS. 2 and 3). Finally, the air disperses the hydrogen as it is released from the water being treated.

Salt, generally in the form of NaCl, furnishes a source of chloride ion (Cl) for the electrolytic conversion of Cl to chlorine. The primary function of the chloride salt (e.g., NaCl) in this invention is to provide a very high concentration of chloride ions at the interface of the operating anode, thus lowering the operating voltage of the electrolytic cell. This voltage vs. chloride salt concentration relationship is shown in FIG. 1. It will be noted that the operating voltage decreased rapidly up to about 20 g NaCl/l and then decreased by only 0.92 volts up to 300 grams NaCl/l (near salt saturation). The preferred range of salt concentration is 20 to 250 g/l, more preferred is 50 to 250 g/l, and most preferred is 100 to 250 g/l. Without being bound by theory, it is also believed that the solubility of chlorine in the electrolyte decreases with increasing ionic strength (higher chloride salt concentrations), thus contributing to the ease with which the chlorine is stripped from the electrolyte in the stripping column.

The chloride ion and the hydrogen ion required for the electrolysis reaction ($HCl \rightarrow H^+ + Cl^-$) is furnished by hydrochloric acid. Initially, there was considerable concern that much of the HCl added to the system would pass through the system unchanged. Pure HCl is very volatile, having a melting point of −114° C. and a boiling point of −84° C. The first tests conducted with the system (no power to the electrolyzer) were to determine the amount of HCl carried through the system over the pH range expected to be used in the process (pH 1–6). This concern proved to be unfounded even though HCl/water forms an azeotrope having a constant boiling point of 110° C. with the distillate containing 20–24% HCl. This lack of carry-over is attributed to the known formation of a series of hydrates with HCl and water.

Commercial hydrochloric acid is available containing 28% to 37% by weight HCl. The formula for commercial hydrochloric acid is more nearly $H_3OCl$ (HCl in solution with water) rather than HCl, and on ionization the equation $H_3OCl \rightarrow H_3O^+ + Cl^-$ is more nearly correct than $HCl \rightarrow H^+ + Cl^-$. In either case, however, the anion $Cl^-$ is furnished by the added hydrochloric acid.

The electrolytic reaction at the "electron hungry" anode removes an electron from the chloride ion:

$$Cl^- \xrightarrow{D.\ C.\ Current} Cl^{\cdot} + e^-$$

producing the highly active free radical (nascent chlorine, $Cl^{\cdot}$). The free radical $Cl^{\cdot}$ stabilizes by forming chlorine:

$$2Cl^{\cdot} \rightarrow Cl_2$$

The volatile $Cl_2$ is transferred to the air in the stripping column.

In the aqueous electrolyte the chlorine ($Cl_2$) will hydrolyze:

$Cl_2 + H_2O \rightarrow HOCl \rightarrow HCl$ or more correctly $Cl_2 + 2H_2O \rightarrow H_3OCl + HOCl$.

Maintaining a low pH of 1–6 by addition of hydrochloric acid represses the forward reaction increasing the effectiveness of $Cl_2$ removal in the stripping column.

Faraday's laws of electrolysis dictates that when electrons are removed from the system by the electron "hungry" anode, as in the $Cl^- \rightarrow Cl^{\cdot} + e^-$ equation above, that an equal number of electrons must be transferred from the cathode to the system. The cathode reaction can be represented as follows:

$$H_3O^+ + 2e^- \rightarrow H_2 + OH^-$$

The hydrogen produced is removed with the chlorine by the stripping column. The base ($OH^-$) is neutralized by the hydrochloric acid added to maintain the low pH of the electrolyte:

$$OH^- + H_3O^+ \rightarrow 2H_2O$$

or $$NaOH + HCl \rightarrow NaCl + H_2O$$

Most other processes for making chlorine electrolytically try to preserve and use the base (OH or NaOH) produced at the cathode. These processes use a complex multiple compartment electrolyzer. Such systems not only are more complex, but the base produced reacts with impurities in the salt which is the source of Cl to make chlorine and/or air which is not excluded from the system. Calcium, magnesium and other impurities will form solids (hydroxide and carbonate compounds) which foul and scale the system, decreasing efficiency and increasing maintenance and downtime of the system.

A major advantage of the process described herein is that solids are not produced because Ca and Mg compounds are soluble in the pH range utilized. Only the volatile compounds (chlorine and hydrogen) are carried through the system; the chlorine produced is free from non-volatile compounds (e.g., sodium chloride, or other salts and impurities such as Ca and Mg). The chlorine treats the water or other liquid that needs to be treated. The hydrogen is diluted below hazardous concentrations and escapes with the carrying air at the treatment location; the concentration of hydrogen is not explosive unless permitted to accumulate (e.g., in some confined space such as a closed tank or reactor).

There are many energy sources for the production of electricity. The most appropriate energy source will be site selective. In oil rich nations natural gas or other hydrocarbons will likely be the energy source of choice. In any case, the electricity to power the electrolyzer will require DC current supplied by a rectifier.. A rectifier is essentially an electron pump for supplying electrons to a cathode and picking up the electrons at the anode. The pressure forcing the flow (amperes) of electrons through the electrolyzer is the voltage. As the voltage is increased, current can be forced to flow according to Faraday's Laws of Electrolysis. The result is to produce desired reactions to form useful products. In the process of this disclosure, it is desired to promote the anode reaction to produce chlorine and the cathode reaction to produce hydrogen.

Anode: 
Cathode: 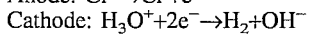

It is preferable to have these occur at the lowest practical voltage without other reactions occurring, thereby achieving high current efficiency. Voltage is a major factor in determining the production cost of chlorine (KWH/lb) and is dependent on the NaCl concentration in the electrolyte as shown in FIG. 1; the voltage is determined from this relationship.

Other reactions may occur which decrease system performance, for example: Production of oxygen at the anode; reduction of chlorine at the cathode; or production of other chlorine compounds beside chlorine. Ways have been discovered for controlling the-system to achieve high current efficiency in producing chlorine meeting the primary objectives of the process of the invention. These ways of controlling the system include controlling the amperage for production rate, pH for acid concentration control, air flow for Cl stripping, electrolyte circulation rate for. Cl removal from the cell and stripping in column, and temperature from ambient temperature up to less than 40° C., preferably 15°–35° C. (temperatures of 40° C. or above can be used but are not desirable). Determination of optimum parameters for a given system can be readily ascertained by those skilled in the art through routine experimentation.

Figure 2:
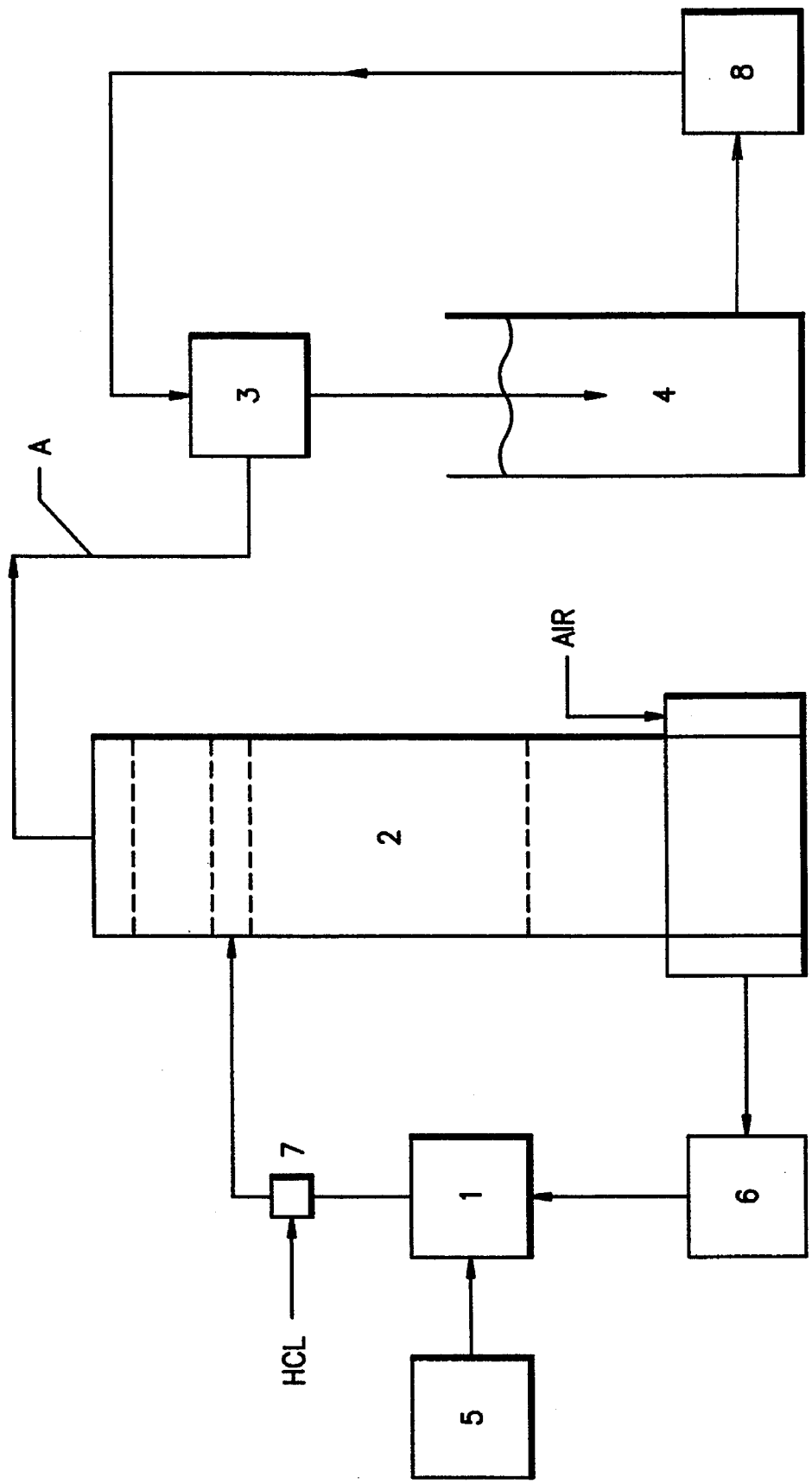
FIG. 2 is a schematic illustration of the primary components of a system according to the invention to produce chlorine on the site of the intended use.

FIG. 2 is an illustration of the primary components of one embodiment of the invention to produce chlorine on the site of the intended use which includes the essential auxiliary components. An electrolyzer 1 including of one or more electrolytic cells containing .one or more anodes and one or more cathodes is enclosed in a suitable container (i.e., any container of a chemically resistant material such as PVC or a ceramic); preferably with a monopolar cell the container is metallic and serves as the cathode. The electrolytic cells each contain one or more anodes and one or more cathodes, arranged electrolytically in series and/or parallel and activated by a direct current rectifier or the like. The electrolyzer 1 may have either monopolar or bipolar cells. The electrode rods or plates may be of any material known to be used as electrodes in the art, particularly those used by PEPCON Systems, Inc. in their hypochlorite units (e.g., PEPCON Systems, Inc. Standard Monopolar Cell as described in Example 2 below). The cells and electrolyzer combinations found to be particularly useful for purposes of the present invention are those where the anodes are graphite rods mounted in titanium cylindrical cathodes. The graphite rods may be coated with a $PbO_2$ electroactive coating or with a bismuth modified $PbO_2$ coating as described in U.S. Pat. No. 4,038,170 (which is incorporated by reference in its entirety). The anodes may be made of titanium or other valve metals (e.g., Nb, Ta) on which one or more platinum group metals form the electroactive coating. For a discussion of metal anodes, see Kirk-Othmer's Encyclopedia of Chemical Technology, Third Edition, volume 15, pages 172–183, which is incorporated by reference.

Also very useful is a PEPCON Systems (Las Vegas, Nev.) bipolar plate electrolyzer using the general configuration originally described in U.S. Pat. No. 4,089,771 (which is incorporated by reference in its entirety). This type of electrolyzer comprises closely nested alternating anode and cathode plates. The anodes are titanium substrate plates coated with one or more platinum group metals. The cathodes are titanium plates.

Titanium is the metal of choice for the cathode. Without being bound by theory, it is believed that the stable titanium oxide or hydroxide produced at the interface of the cathode by the reaction between the titanium and the hydroxyl ($OH^-$) flux produced by the operating cathode inhibits the reduction of chlorine at the cathode surface.

As noted above, the anode may be titanium or other valve metal (e.g., Nb, Ta) substrates coated with platinum or other platinum group metals. In addition, the cathodes may be titanium or other valve metal substances, copper, stainless steel, lead or iron. Anodes can be graphite, lead dioxide coated graphite and the coated metal described above.

The electrolyzer 1 may be of any suitable design for removing electrons from chloride ions to produce chlorine at the anode of the electrolyzer.

Rectifier 5 produces the DC power for the electrolyzer 1. Suitable rectifiers for the invention are commercially available and well known to those skilled in the art.

Gas stripping column 2 separates the cell gases ($H_2$, $Cl_2$) from the electrolyte. The feature of the gas stripping column is to remove the chlorine produced in the electrolyzer 1, thus eliminating the possibility of reduction on another pass through the electrolyzer. Another feature is to dilute the hydrogen and chlorine cell gases below the explosive range. Another feature is to provide air as a carrier gas to carry the chlorine to the point of use.

Vacuum device 3, preferably an eductor, moves the stripping air, chlorine and other cell gases through the stripping column 2 and introduces the chlorine into the substance to be treated for the desired treatment (e.g., sanitized, purified). The substance or medium to be treated include solutions, suspensions, slurries, dispersions, and flowable (pumpable) sludges which can be treated with chlorine. Treatment tank 4 contains the solution to be treated with chlorine. The treatment tank 4 might be the chlorine contact tank of a sewage treatment tank, storage tank for potable water, distribution tank for power plant condenser cooling water, oxidation tank for an odor control system, or a NaOH reactor for hypochlorite generation.

Recycle pump 6 circulates the electrolyte solution from the basin at the bottom of the stripping column 2 through the electrolyzer 1 past an HCl injection point and mixing unit 7 into a gas disengagement section of the stripping column 2 where it contacts the stripping air that was introduced into the basin of the tower as schematically illustrated in FIG. 2. An optional piece of equipment, not shown, is a fail-safe device which automatically shuts the system down in case the recycle pump 6 fails. Suitable recycle pumps for the invention are commercially available and well known to those skilled in the art.

HCl/electrolyte mixing unit 7 mixes HCl and the electrolyte from the electrolyzer 1.

Recycle pump e circulates the aqueous solution (liquid) to be treated with chlorine from the treatment tank 4 through the eductor 3 and back through the treatment tank 4. This recycle pump may be a conventional, commercially available pump, well known to those skilled in the art. The treatment tank 4 may represent a moving stream such as that of a chlorine treatment chamber in a final effluent of a sewage treatment plant. Alternatively, treatment tank 4 may be a tank containing aqueous caustic solution (e.g., Sodium hydroxide) to produce alkali metal or alkaline earth metal hypochlorites (e.g., sodium hypochlorite) at elevated concentrations for any desired purpose. The hypochlorite can also be produced as a substitute chlorine compound for use during maintenance periods.

Caustic (sodium hydroxide) scrubbers may be introduced into the system at Point A of FIG. 2 to react with, collect and analyze the chlorine containing volatile compounds from the gas stripping column.

Figure 3:
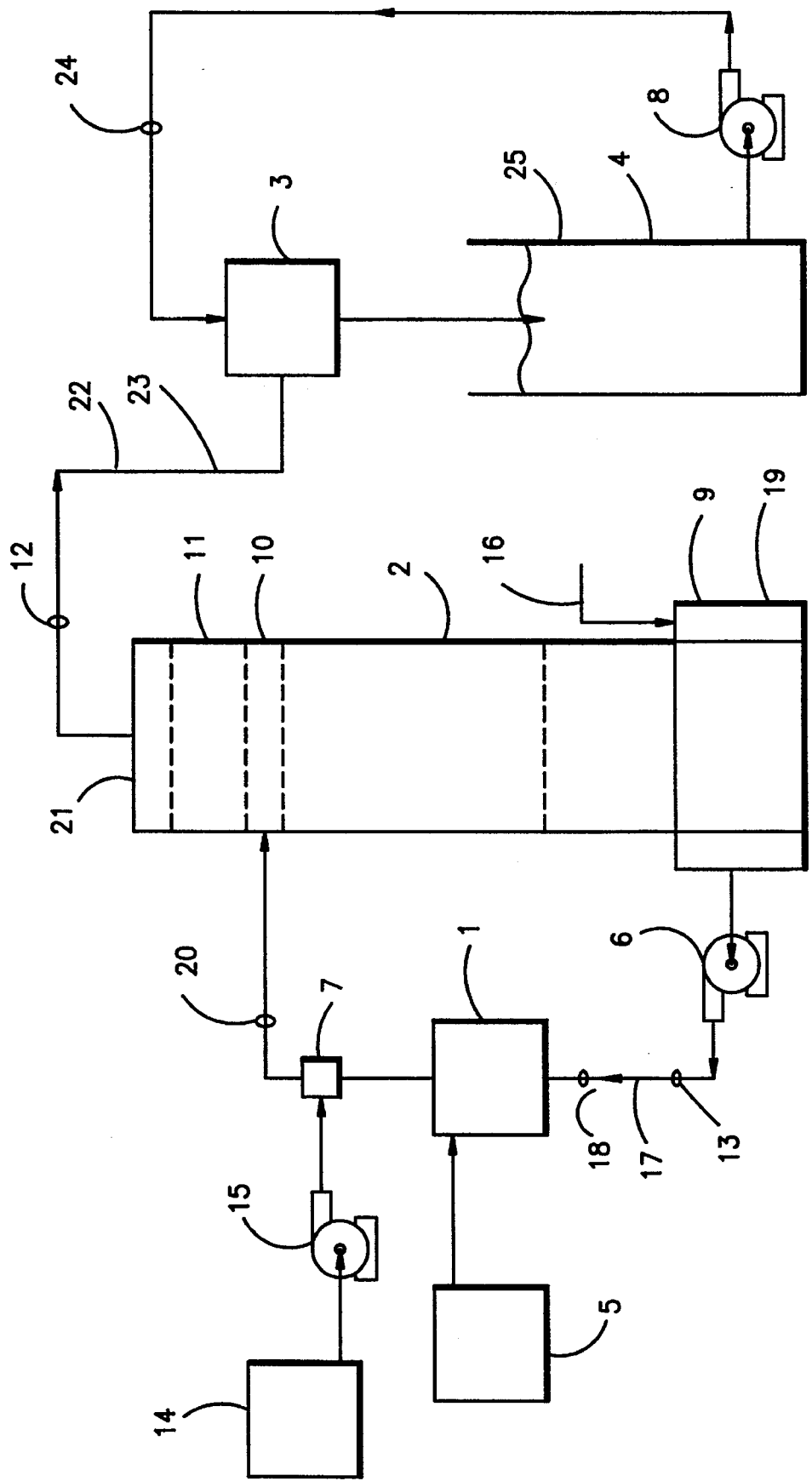
FIG. 3 is a schematic illustration of the primary components of a system according to another embodiment of the invention to produce chlorine on the site of the intended use.

A volatile high purity chlorine generator is illustrated in FIG. 3 which is a schematic illustration of the primary components of a system according to another embodiment of the invention to produce chlorine on the site of the intended use. A sodium chloride electrolyte solution is contained in basin 9. The electrolyte solution can be obtained by dissolving sodium chloride crystals in deionized water to a concentration containing, for example, 100 to 250 grams of sodium chloride per liter (near saturation). A pH controller 19 is located in basin 9 in order to monitor and control the pH of the electrolyte solution in basin 9 by hydrochloric acid addition to the system.

The electrolyte solution is pumped at a controlled feed rate by pump 6 through an electrolyzer 1 which may have either monopolar or bipolar cells. The cells may be constructed of any material known to be used as electrodes in the art. One type of pump 6 that can be used is a positive displacement pump. In line 13, which transports the electrolyte solution to the electrolyzer 1, are two instruments. One instrument is a flow indicator 17 to enable precise control of the electrolyte feed to the electrolyzer 1. The second instrument is a flow switch 18 that is activated by a low electrolyte flow in line 13 which in turn shuts off the power to the rectifier 5 to maintain a safe system operation.

A rectifier 5 is used as the source of DC power for the electrolyzer 1. The DC power output of the rectifier 5 can be controlled for varying DC voltages and DC current. The rectifier 5 is operated at maximum output until the system is producing chlorine at the desired rate at the point of use. The operating level of the rectifier 5 and electrolyzer 1 can be controlled either manually or automatically to vary chlorine output.

On activation of the rectifier 5, a sequence of electrochemical reactions is initiated. The primary cell reaction being

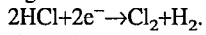
$$2HCl + 2e^- \rightarrow Cl_2 + H_2.$$

Both products are gases and are carried from the electrolyzer 1 with the electrolyte flow. The flow proceeds to an HCl electrolyte mixer 7 where concentrated hydrochloric acid 37% by weight is introduced. The hydrochloric acid is stored in tank 14 and is fed into the HCl electrolyte mixer 7 by pump 15. One type of pump that can be used is a diaphragm pump. The pump 15 is controlled automatically from the pH controller 19 located in the basin 9. The system pH control is set to maintain a desired pH setpoint between 1 and 6 (1.0–6.0; preferably 2–4 or 2.0–4.0) in the electrolyte in basin 9.

The solution flow leaves the HCl electrolyte mixer 7 and is transferred in line 20 to the gas-liquid disengagement section 10 of the gas stripping column 21. The gas stream of stripping air, chlorine and other cell gases pass through demister section 11 and then leave gas stripping column 21 and are transported in line 12 to an eductor 3. There are two instruments in line 12, one is a flow and/or pressure indicator 22 that is used to monitor the air flow 16 through the stripping column 21. In take air enters the stripping column 21 at air inlet 16. The other instrument in line 12 is a flow and/or pressure switch 23 that is activated by low gas flow and/or pressure from the stripping column 21 which in turn shuts off the power to the rectifier 5 to maintain a safe system operation.

The eductor (source of vacuum) 3 is the water motivated source of vacuum in the system that pulls air into the gas stripping column 21 at air inlet 16 and delivers the chlorine to its point of use in treatment tank 4. A vacuum pump could also be used in this application. A product recycle pump 8 circulates the solution from the treatment tank 4 through line 24 to the eductor 3. In eductor 3 the gases from the stripping column 21 are mixed with the solution from the treatment tank 4 and then returned to tank 4.

The treatment tank 4 may, for example, represent the following:
1. Substance (e.g., solutions, suspensions, slurries, dispersions, and flowable (pumpable) sludges) that requires treatment with chlorine such as the final effluent of a sewage treatment plant or a potable water source requiring chlorination. The concentration of chlorine required is dependent on the application and can range from parts per million (ppm) to pure. An oxidation-reduction sensor (ORP) 25 can be provided and placed at an appropriate location in the process stream being treated. The ORP sensor 25 continuously monitors the concentration of chlorine in the solution and, if required, can control the rectifier 5 output and subsequently the chlorine production.
2. Method of producing sodium hypochlorite by the reaction of the chlorine and a sodium hydroxide solution contained in the tank.

In either event, the chlorine is reacted with a substance to be treated and the hydrogen is discharged to the atmosphere.

Returning to the point where the electrolyte flow enters the gas-liquid disengagement section 10 of the gas stripping column 21, the electrolyte is sprayed onto the top of packed section 2 (which is packed with commercially available resistant packing such as ceramics, glass, and plastics such as polypropylene spheres) in stripping column 21 upon disengagement of the stripping air, chlorine and other cell gases. The electrolyte flows uniformly downward throughout the packed section 2 where it is contacted by a countercurrent air flow which strips the chlorine from the downward flowing electrolyte. This stripping or desorption of the chlorine from the electrolyte by counter current flow is a key element of this process. The electrolyte reenters the basin 9 where it is again recycled through the process generating additional chlorine gas.

An electrolyte is prepared by dissolving sodium chloride (NaCl) in water at ambient temperature to give a solution containing from 10 g/l NaCl to saturation. The electrolyte is introduced into the basin 9 of the gas stripping column 21.

A pH controller 19 is provided in the electrolyte solution to monitor and control the pH to a target pH (1–6).

Recycle pump 6 is actuated and the flow rate is adjusted to the desired rate to circulate the electrolyte through the electrolyzer 1, past the HCl introduction point, through the HCl electrolyte mixer to the gas-liquid separation section of the stripping column 21 and back to the basin 9.

The gas stripping column 21 comprises four sections:
1. the basin 9 of the column;
2. a packed section 2 between the basin and the gas disengagement section;
3. the gas disengagement section be; and
4. the demister section 11 to prevent liquid carryover with the volatile compounds.

The hydrochloric acid pump 15 is actuated by the pH controller 19 set to the desired setpoint (pH 1–6) to maintain the pH at a preselected level.

The product recycle pump 8 is activated to circulate the solution to be treated through the eductor 3 and back to the treatment tank 4.

The activated eductor 3 creates a controlled vacuum in the air-chlorine line from the top of the stripping column 21 to the eductor 3. A gas flow indicator 22 detects low flow or a pressure detector senses high pressure in the line. The sensors are fail-safe devices that will prevent operation of the rectifier 5 if the stripping air is not passing through the system from the stripping column 21 to the eductor 3.

The rectifier 5 is actuated and the amperes are set at the recommended maximum operating level. The rectifier 5 should be operated at maximum level until it is producing the chlorine at the desired rate and then reduced to the operating level. The operating level (amperage) of the rectifier 5 can be controlled either manually or automatically to vary the chlorine equivalent output at the desired rate.

As noted above, on activation of the rectifier 5, a sequence of electrochemical reactions is initiated to induce the following reaction:

$$2HCl + 2e^- \rightarrow Cl_2 + H_2.$$

Both products are gases and are carried with the electrolyte to the gas disengagement section 10 of the stripping column 21. The cell gases are stripped by the stripping air passing through the packed section 2 of the stripping column 21, diluted into a safe range by the air and carried with the air to the point of use. The chlorine reacts with the solution being treated and the hydrogen is discharged to the atmosphere. For a discussion of packed columns, see Kirk-Othmer's *Encyclopedia of Chemical Technology*, Third Edition, volume 1, page 54 and volume 7, pages 849-891, which are incorporated by reference.

An oxidation reduction potential sensor (ORP) 25 can be provided and placed, at the appropriate location, in the solution to be treated. The ORP probe continuously monitors the concentration (if the solution is in the milligram per liter (mg/l) range) and through an electronic control board the millivolt signal controls the output of the rectifier 5 to produce the desired chlorine concentration in the solution being treated.

The control limits of each system will be customized to the requirements of the system on a site selective basis. Determination of the appropriate limits may be accomplished by those skilled in the art through routine experimentation.

The system provides the means, for example, to route the stripping air/chlorine gases through an alkali (e.g., NaOH) absorption tank where sodium hypochlorite is produced by the reaction: $2NaOH + Cl_2 \rightarrow NaOCl + NaCl + H_2O$.

The following examples are illustrative of the invention:

EXAMPLE 1

A bench scale system, having the components previously described, was assembled. The electrolyzer was a small monopolar cell using a graphite substrate, lead dioxide electrocoated surface anode (20 square inches active surface), and a stainless steel cathode. The cell was activated by a 100 amp/12 volt constant current rectifier. The stripping column included a basin, a packed section (49 inches high, 3 inches in diameter) packed with 1" diameter polypropylene spheres, a gas/liquid separation section to separate the electrolyte/cell gas stream, and a demister section (5½ inches high and 3 inches in diameter) packed with broken fragments of the 1 inch diameter polypropylene spheres.

Air was introduced into the basin of the stripping column to strip the cell gases from the recycling electrolyte.

The air/cell gas mixture was transferred to the point of use through Tygon® tubing under vacuum produced by an eductor activated by recirculation of water from the product tank through the eductor and back to the tank.

In this test, caustic absorbers were inserted into the Tygon™ tubing line from the top of the stripping column to the eductor. The reaction was as follows:

$$2NaOH + Cl_2 \rightarrow NaOCl + NaCl + H_2O.$$

This equation permits the quantitative determination of the products and rate of the cell reaction.

The system was operated under the conditions previously described. The results are given in Table 1.

EXAMPLE 2

This test was performed in a similar manner to that illustrated and described in Example 1, except that the electrolyzer (cell of Example 1) was replaced with a PEPCON Systems, Inc. Standard Monopolar Cell having an active anode surface of 100 square inches, the volume of the circulating electrolyte was increased, the capacity of an eductor was increased to increase the flow of stripping air through the system, and two sets of caustic scrubbers were used in series to assure efficient chlorine absorption with the high gas flow. The test results are given in Table 2.

The PEPCON Systems, Inc. Standard Monopolar Cell is a monopolar cell comprising a $PbO_2$ coated graphite anode contained in a cylindrical titanium cathode. The cell is closed and fed from the bottom. The electrolyte and gas mixture exits at the top going to the stripping tower.

EXAMPLE 3

This test was similar to that in Example 2 except that an uncoated graphite anode was used in place of the PEPCON System's $PbO_2$ coated anode and the pH was lowered to 3.0 instead of using 4.5. Test results are given in Table 3.

Figure 4:
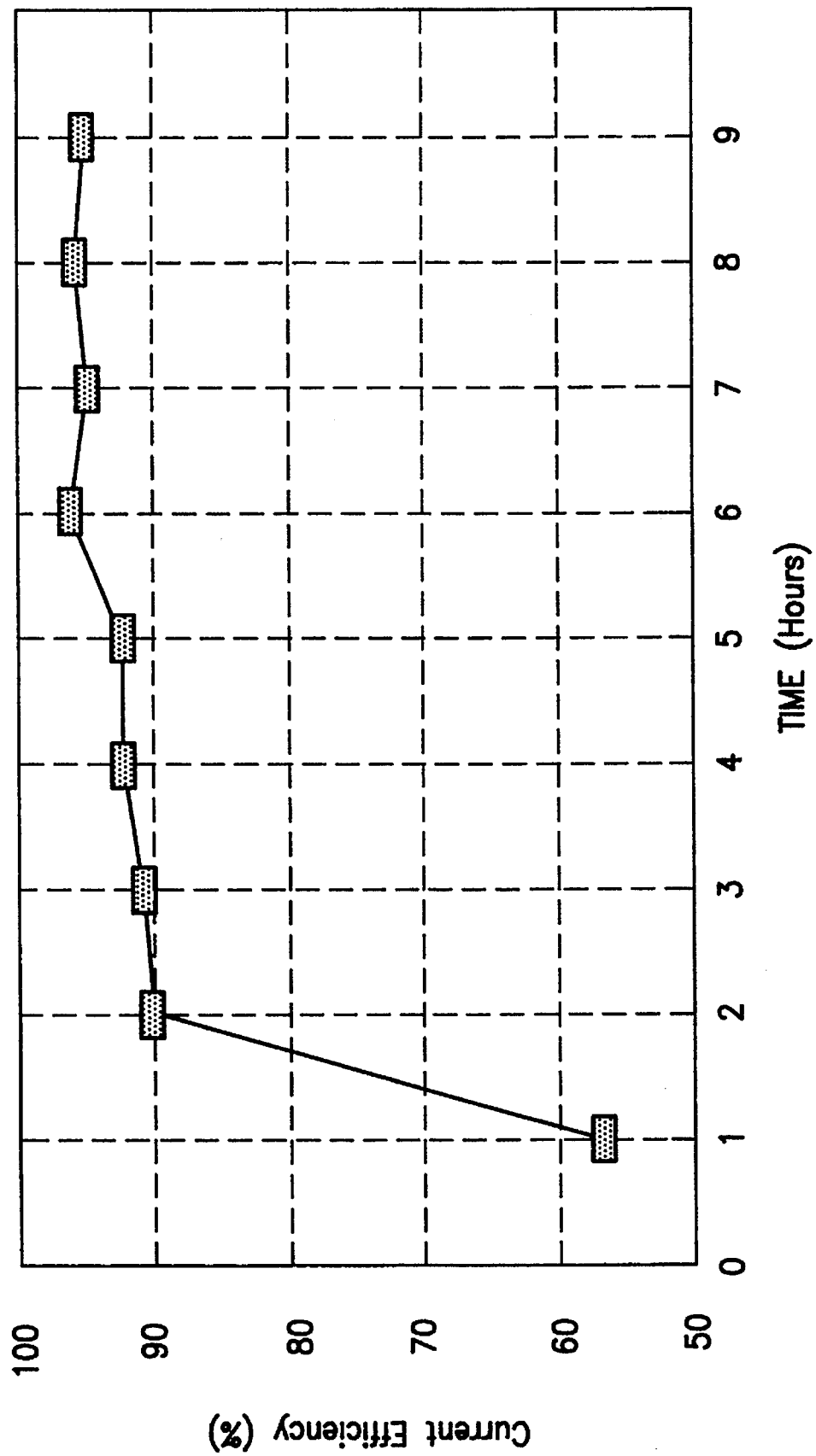
FIG. 4 shows the current efficiency of the system according to the invention.

The results presented in Tables 1, 2 and 3 illustrate the operation of the process under different experimental (operating) conditions. The results were obtained from chemical analysis of the electrolyte in the basin and the solution in the gas scrubbers. The chlorine collected in the scrubbers is the product and is used to measure current efficiency. In these examples current efficiencies of 82%, 89% and 81% respectively are found whereas the prior art (e.g., U.S. Pat. No. 5,039,383) only snows a current efficiency of 77%. FIG. 4 illustrates the current efficiency based on the data in Table 2.

The basin results show any changes in the electrolyte and are used to determine chloride balances and establishing other operating variables.

Figure 5:
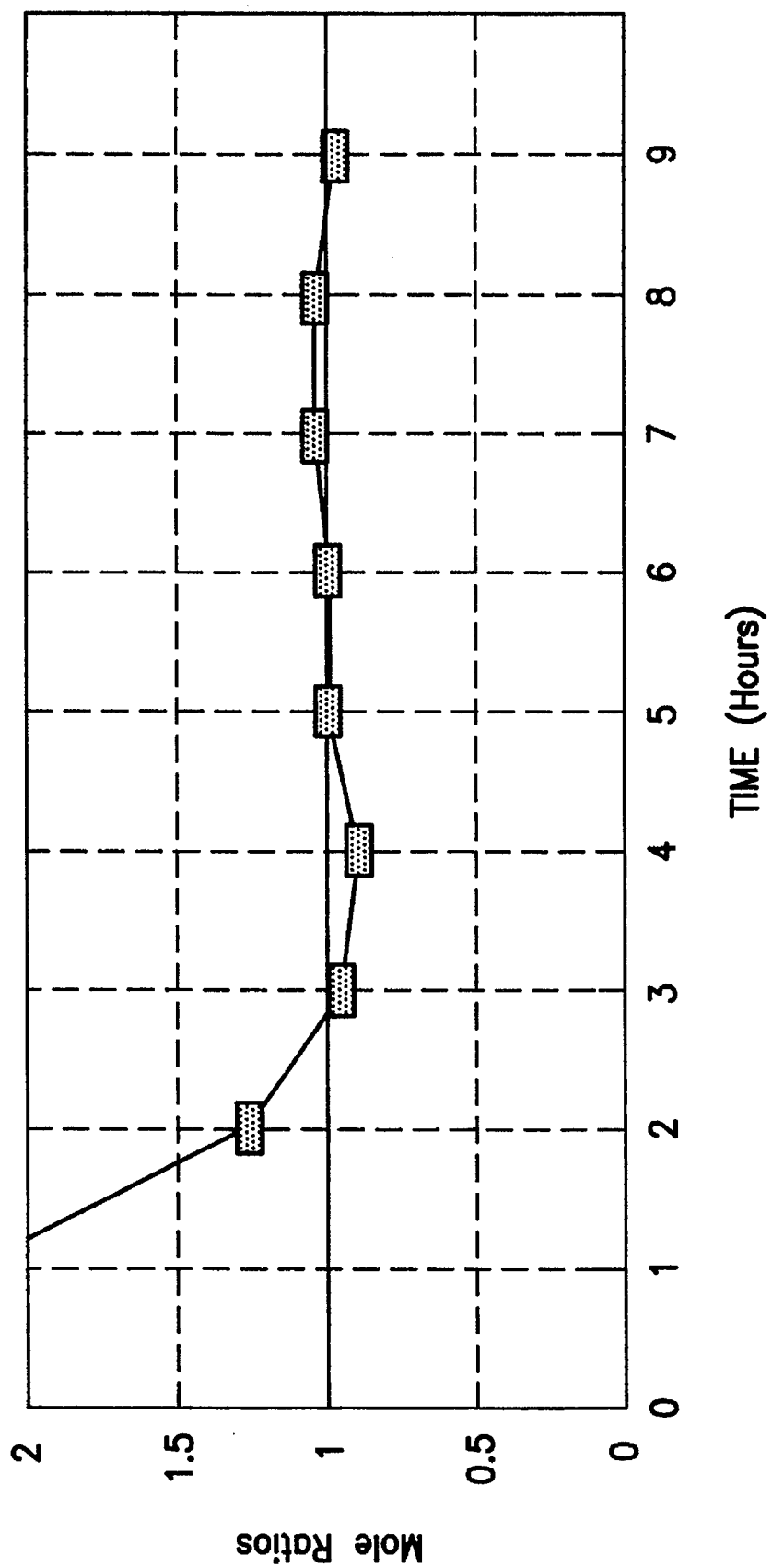
FIG. 5 shows the mole ratio between NaCl and NaOCl in the scrubber solution where caustic (sodium hydroxide) scrubbers are introduced into the system at Point A of FIG. 2 to react with, collect and analyze the chlorine containing volatile compounds from the gas stripping column.

The chlorine was, as a minimum, 99% pure and probably higher. Analytical techniques used do not permit a better estimation of the chlorine purity. FIG. 5 presents the mole ratio between NaCl and NaOCl in the scrubber solution. This ratio should be 1.0 if pure (100%) chlorine is collected. The ratio averaged 0.99 over the steady state part of the experiment. This is determined by the equation $$2NaOH + Cl_2 \rightarrow NaCl + NaOCl + H_2O.$$

Objects which were achieved by the present invention include the following: To the extent possible the chemistry involved was theoretically explained. Chlorine was electrolytically produced at high current efficiency determined from the Faradays (theoretical) used (amp hrs) and the amount of chlorine collected in the gas scrubbers as determined by chemical analysis; the basic equation is actual $Cl_2$ produced divided by theoretical $Cl_2$ produced ×100. The production of chlorine was achieved without scale or objectionable by-products; in other words, only high purity chlorine (at least 99%) was produced. The chlorine and by-product hydrogen from the electrolyzer was safely transferred to the water being treated and the formation of solids was avoided in every part of the system. The system was automatically controlled to maintain desired optimum performance. "Fail safe" features to automatically shut the system down in case of the failure of some component were provided.

Further variations and modifications of the foregoing will be apparent to those skilled in the art and such variations and modifications are intended to be encompassed by the claims that are appended hereto.

The U.S. Patents cited herein are incorporated by reference in their entirety.

TABLE 1

| EXPERIMENTAL CELL RESULTS | |
|---|---|
| CELL: | PEPCON Systems ANODE, STAINLESS STEEL CATHODE AT 20 AMPS |
| ELECTROLYTE: | |
| STARTING: | NaCl 95 (g/L), pH 4.5, Volume 6.0 L |
| ENDING: | NaCl 80 (g/L) |
| | NaClO 5.5 (g/L) |
| | NaClO$_3$ 5.3 (g/L) |
| | pH 4.5 (4.3–4.7) |
| | Volume 6.0 L |
| AMP. HOURS: | 380, 14.2 Faradays |
| PRODUCT: | Chlorine, Cl$_2$, 416 g |
| CURRENT EFFICIENCY: | 82% |
| HCl ADDED: | 890 ml, 37%, 380 g Cl$^-$ |
| H$_2$O ADDED: | 670 ml from acid, 500 ml make-up |

TABLE 2

| EXPERIMENTAL CELL 100 | |
|---|---|
| CELL: | PEPCON Systems ANODE, TITANIUM CATHODE 100 AMP CELL AT 100 AMPS |
| ELECTROLYTE: | |
| STARTING: | NaCl 74.3 (g/L), pH 4.3, Volume 6.5 L |
| ENDING: | NaCl 67.3 (g/L) |
| | NaClO 0.86 (g/L) |
| | NaClO$_3$ 4.68 (g/L) |
| | pH 4.5 |
| | Volume 6.5 L |
| AMP HOURS: | 600 22.4 Faradays |
| PRODUCT: | Chlorine, Cl$_2$ 612 g |
| CURRENT EFFICIENCY: | 77% |
| HCl ADDED: | 1560 ml, 37%, 668 g Cl$^-$ |
| H$_2$O ADDED: | 1170 ml from acid, No make-up |

TABLE 3

| EXPERIMENTAL CELL GRAPHITE ANODE | |
|---|---|
| CELL: | PEPCON Systems 100 AMP CELL TITANIUM CATHODE, GRAPHITE ANODE AT 30 AMPS |
| ELECTROLYTE: | |
| STARTING: | NaCL 96.7 (g/L), pH 3.0 |
| | Volume 7.0 L |

TABLE 3-continued

| EXPERIMENTAL CELL GRAPHITE ANODE | |
|---|---|
| ENDING | NaCl 92.5 |
| | NaOCl 0.1 |
| | NaClO$_3$ 0.8 |
| | pH 3.3 |
| | Volume 7.01. (1) |
| AMP. HOURS: | 150; 5.6 Faradays |
| PRODUCT: | Chlorine, 162 g |
| CURRENT EFFICIENCY: | 81 |
| KWH/Kg Cl: | 2.95 |
| HCL ADDED: | 37%, 365 ml, 427 g |
| H$_2$O ADDED: From HCl: | 269 ml, No makeup |

We claim:

1. A process for the continuous production of chlorine, comprising introducing an electrolyte into an electrolyzer, said electrolyzer having at least one anode and at least one cathode in contact with said electrolyte, providing an electric current across said electrolyzer to cause formation of H$_2$ and Cl$_2$ in the electrolyte, continuously removing said electrolyte from said electrolyzer to an air stream in a gas stripping column removing said H$_2$ and Cl$_2$ from said electrolyte in said gas stripping column, and recycling said electrolyte from which H$_2$ and Cl$_2$ has been removed into said electrolyzer;

said electrolyte being maintained at a pH of 1 to 6, said electrolyte being an aqueous solution of a salt selected from the group consisting of a chloride of an alkali metal, a chloride of an alkaline earth metal, and mixtures thereof, wherein said salt is present in a concentration of 10 to 300 g/l.

2. The process according to claim 1 wherein said pH is 2 to 4.

3. The process according to claim 1 wherein said alkali metal is selected from the group consisting of Li, Na, K, Rb, Cs, Fr and mixtures thereof and said alkaline metal is selected from the group consisting of Ca, Sr, Ba, Ra, Mg and mixtures thereof.

4. The process according to claim 1 wherein said salt is NaCl.

5. The process according to claim 5 wherein said salt is present in a concentration of 20 to 250 g/l.

6. The process according to claim 5 wherein said salt is present in a concentration of 50 to 250 g/l.

7. The process according to claim 6 wherein said salt is present in a concentration of 100 to 250 g/l.

8. The process according to claim 1, wherein said Cl$_2$ is free from non-volatile compounds.

9. The process according to claim 1, wherein said process is conducted at a temperature from ambient temperature up to less than 40° C.

10. The process according to claim 1, wherein said process is conducted at a temperature from 15° to 35° C.

11. A process for the treatment of a substance by chlorine, comprising:

introducing an electrolyte into an electrolyzer, said electrolyzer having at least one anode and at least one cathode in contact with said electrolyte, providing an electric current across said electrolyzer to cause formation of H$_2$ and Cl$_2$, continuously removing said electrolyte from said electrolyzer to an air stream in a gas stripping column removing said $H_2$ and $Cl_2$ from said electrolyte in said gas stripping column, recycling said electrolyte from which $H_2$ and $Cl_2$ has been removed into said electrolyzer, and contacting said $Cl_2$ removed from said electrolyte in said gas stripping column with a substance to be treated;

said electrolyte being maintained at a pH of 1 to 6, said electrolyte being an aqueous solution of a salt selected from the group consisting of a chloride of an alkali metal, a chloride of an alkaline earth metal, and mixtures thereof, wherein said salt is present in a concentration of 10 to 300 g/l.

12. The process according to claim 11 wherein said substance to be treated is an aqueous caustic solution which reacts with said $Cl_2$ to absorb and convert said $Cl_2$ to an alkali or alkaline earth hypochlorite product.

13. The process according to claim 12 wherein said aqueous caustic solution is aqueous sodium hydroxide solution.

14. The process according to claim 11 wherein said pH is 2 to 4.

15. The process according to claim 11 wherein said alkali metal is selected from the group consisting of Li, Na, K, Rb, Cs, Fr and mixtures thereof and said alkaline metal is selected from the group consisting of Ca, Sr, Ba, Ra, Mg and mixtures thereof.

16. The process according to claim 11 wherein said salt is NaCl.

17. The process according to claim 11 wherein said salt is present in a concentration of 20 to 250 g/l.

18. The process according to claim 17 wherein said salt is present in a concentration of 50 to 250 g/l.

19. The process according to claim 18 wherein said salt is present in a concentration of 100 to 250 g/l.

20. The process according to claim 11, wherein said $Cl_2$ is free from non-volatile compounds.

21. The process according to claim 11, wherein said process is conducted at a temperature from ambient temperature up to less than 40° C.

22. The process according to claim 11, wherein said process is conducted at a temperature from 15° to 35° C.

* * * * *